United States Patent
Eastlake, III

(10) Patent No.: US 7,734,280 B2
(45) Date of Patent: Jun. 8, 2010

(54) METHOD AND APPARATUS FOR AUTHENTICATION OF MOBILE DEVICES

(75) Inventor: Donald E. Eastlake, III, Milford, MA (US)

(73) Assignee: Motorola, Inc., Schaumburg, IL (US)

( * ) Notice: Subject to any disclaimer, the term of this patent is extended or adjusted under 35 U.S.C. 154(b) by 615 days.

(21) Appl. No.: 11/255,475

(22) Filed: Oct. 21, 2005

(65) Prior Publication Data

US 2006/0094401 A1 May 4, 2006

Related U.S. Application Data

(60) Provisional application No. 60/623,407, filed on Oct. 29, 2004.

(51) Int. Cl.
- H04M 1/66 (2006.01)
- H04M 1/68 (2006.01)
- H04M 3/16 (2006.01)
- H04K 1/00 (2006.01)
- H04L 9/00 (2006.01)
- H04L 9/32 (2006.01)
- G06F 21/00 (2006.01)

(52) U.S. Cl. ........................ 455/411; 455/410; 380/247; 380/259; 380/270; 713/169; 713/182; 726/2; 726/4; 726/27

(58) Field of Classification Search ................. 455/410, 455/411; 380/247, 259, 270; 726/2, 27, 726/4; 713/169, 182
See application file for complete search history.

(56) References Cited

U.S. PATENT DOCUMENTS

| | | | |
|---|---|---|---|
| 5,091,942 A * | 2/1992 | Dent ........................... 380/46 |
| 5,668,875 A | 9/1997 | Brown et al. | |
| 5,689,563 A * | 11/1997 | Brown et al. ................. 380/247 |
| 6,047,070 A * | 4/2000 | Raaf ........................... 380/270 |
| 6,577,643 B1 | 6/2003 | Rai et al. | |
| 6,711,400 B1 * | 3/2004 | Aura ........................... 455/411 |
| 7,421,582 B2 | 9/2008 | Fu | |
| 2002/0069278 A1 | 6/2002 | Forslow | |
| 2002/0191593 A1 | 12/2002 | O'Neill et al. | |
| 2002/0197979 A1 * | 12/2002 | Vanderveen ................. 455/410 |
| 2003/0091030 A1 | 5/2003 | Yegin et al. | |
| 2003/0235305 A1 * | 12/2003 | Hsu ........................... 380/247 |
| 2004/0023689 A1 * | 2/2004 | Ahonen ....................... 455/558 |

OTHER PUBLICATIONS

PCT/US05/39143, PCT Search Report and Written Opinion, mailed Oct. 5, 2006, 8 pages.
Korean Patent Office, Office Action, Rejection [translated], Jul. 15, 2008, 2 pages.

* cited by examiner

*Primary Examiner*—Vincent P Harper
*Assistant Examiner*—Ariel Balaoing
(74) *Attorney, Agent, or Firm*—Randi L. Karpinia; Indira Saladi

(57) ABSTRACT

A method and apparatus for authentication in a wireless communication network is disclosed. A secret is shared between a mobile device and a home device. When a mobile device requests a connection to a remote device and the remote device does not have knowledge of the shared secret, the remote device determines whether the mobile device can connect to the remote device by concurrently sending a challenge to the mobile device and the home device. The remote device then compares the responses from the mobile device and the home device.

16 Claims, 2 Drawing Sheets

METHOD AND APPARATUS FOR AUTHENTICATION OF MOBILE DEVICES

RELATED APPLICATIONS

The present application is related to and claims priority from the following U.S. application commonly owned with this application by Motorola, Inc.: Ser. No. 60/623,407, filed Oct. 29, 2004, titled "METHOD AND APPARATUS FOR AUTHENTICATION OF MOBILE DEVICES".

FIELD OF THE INVENTION

The present invention relates generally to wireless communication systems and in particular to the field of authentication in a wireless network.

BACKGROUND

Because modern communication is increasingly ad hoc and mobile, there is a need for authentication of mobile devices. In wireless networks where security, resource control, and/or accounting is managed, a mobile device may need to be authenticated and authorized before the mobile device is granted access to services in the wireless network. Further, secure communications are necessary in wireless networks because the communication link in which communications take place is easily observable and easily tampered with. For example, a false message may be inserted into a communication between a mobile device and the wireless network to which the mobile device is connected. Such secure communications necessarily require authentication of the mobile device.

There are many existing authentication techniques, however, the existing techniques are lacking for a number of reasons. The first category of authentication techniques involves the use of public key cryptography. Examples of public key cryptography include Digital Signature Standard (DSS), Rivest Shamir Adelman (RSA), and Diffie-Hellman algorithms. However, such examples are computationally intensive which makes them inappropriate as a general technique for a wireless network environment where mobile devices are limited in computational and power capabilities. Such public key techniques may be used on initial connection, when more delay can be tolerated, but may not be acceptable as part of the process to authenticate to a new connection point during a real-time transfer such as a voice conversation.

The second category of authentication techniques requires the release by a home network to a remote network of a secret also known to the mobile device. These techniques are also lacking because such techniques reduce security and control. For example, releasing the secret to a remote network may allow a malign remote network to impersonate the home network and perform improper authentications. Further, giving the secret to a remote network may allow the remote network to eavesdrop on the mobile device's communications with subsequent remote networks which decreases the level of security in the wireless network.

The third category of authentication techniques involves a large number of sequential protocol exchanges (round trips) between the mobile device, remote network, and the home network which induces much latency. Examples of such techniques involve the flow of messages 1) from the mobile device through the remote network back to the home network and 2) from the home network back through the remote network to the mobile device. In certain applications where latency can be a critical problem, such as voice and other isochronous communications, having such latency is not acceptable. For example, a communication session between public safety personnel can not tolerate the significant delay or interruption to voice that such techniques cause.

Accordingly, there exists a need for an improved method of authenticating mobile devices.

BRIEF DESCRIPTION OF THE FIGURES

The present invention is illustrated by way of example and not limitation in the accompanying figures, in which like references indicate similar elements, and in which.

Figure 1:
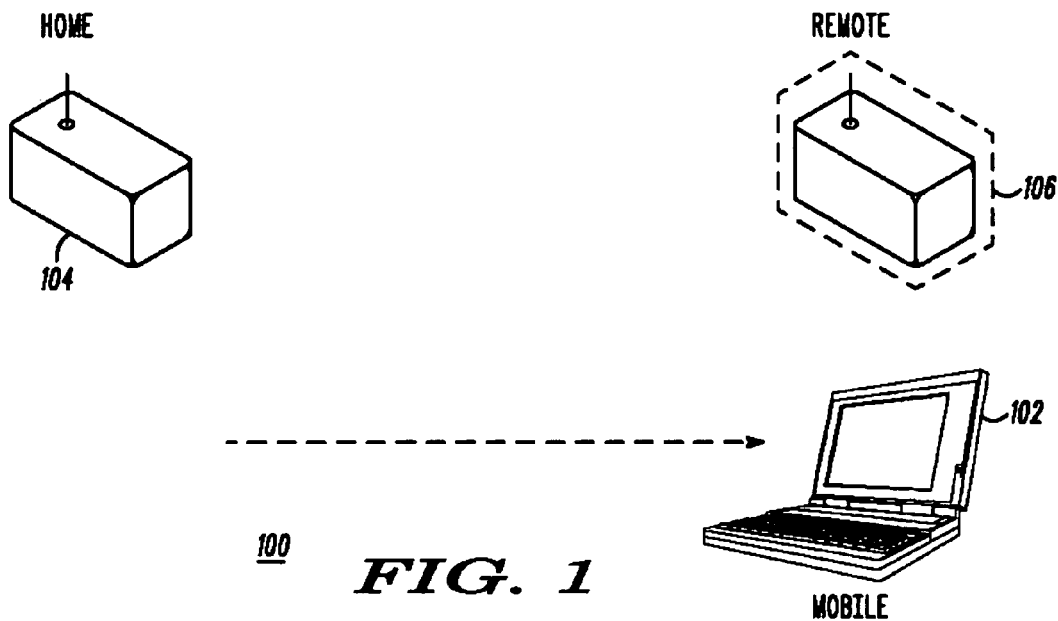
FIG. 1 is an example of a simple block diagram illustrating a WLAN in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail authentication in accordance with the present invention, it should be observed that the present invention resides primarily in combinations of method steps and apparatus components related to authentication. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A method and apparatus for authenticating a mobile device as it connects to a remote device based on a secret that the mobile device shares with a home device is disclosed. Referring to FIG. 1, a wireless communication system, such as a wireless personal, local, metropolitan, or regional area network (e.g. WPAN, WLAN, WMAN, or WRAN) 100, according to the present invention illustratively includes two authenticating entities or devices, which are in this illustration access points (AP) 104 and 106. APs 104 and 106 may provide access to an underlying network that may be implemented, for instance, as a wired network or as a mesh network having fixed or mobile access points. APs 104 and 106 may be, for instance, base stations. In this illustration, AP 104 provides access to a first network having a first coverage area, and AP 106 provides access to a second network having a second coverage area. The first and second coverage areas may or may not be overlapping. As used herein, the first network is defined as a home network and the AP 104 is termed a home device. Similarly, the second network is defined as a remote network and AP 106 is termed a remote device; however, such terms are only used for ease of explanation and do not confer limitations on an embodiment of the present invention.

FIG. 1 only shows two APs servicing two coverage areas for the purpose of ease of illustration. However, it should be understood by those of ordinary skill in the art that a WLAN 100 may be designed with any number of access points servicing a plurality of coverage areas. FIG. 1 also illustrates access points being the authenticating entities. However, those of ordinary skill in the art will realize that the type of authenticating entity is dependant upon the layer (e.g., link, network, applications, etc.) at which authentication occurs. In a first embodiment of the present invention, the communications between the two APs is secure and is performed by well known security processes, including IPSEC, TLS/SSL, SSH, CMS, and others. In alternatives, e.g. the second alternative described below, the communications between the two APs is not secure.

As shown in FIG. 1, a mobile device 102 may roam from the first coverage area to the second coverage (as illustrated by the dashed arrow). Mobile device 102 may be any suitable type of wireless communications device capable of communicating within the WLAN 100, for instance, a laptop computer, a personal digital assistant, a voice handset, or any other suitable device as will be appreciated by those of skill in the art. The mobile device may also be connected to a fixed communications infrastructure, if desired.

It is assumed for purposes of this example that while in the first coverage area mobile device 102 had access to the WLAN 100 as a result of a successful authentication process with AP 104. During this authentication process, mobile device 102 was verified or identified as being authorized to have access to the WLAN resources. Moreover, if mutual authentication was performed (as it generally is in highly secure systems), AP 104 was also verified as a legitimate access point for providing access to the WLAN resources, to prevent rogue access points from fooling a mobile device or acting as a man-in-the-middle to gain access to the WLAN resources. In addition, the authentication process would result in a shared secret being in place at both mobile device 102 and AP 104 for secure (e.g., encrypted and/or authenticated) communications between the two.

In one embodiment, the WLAN 100 may be an 802.11 WLAN network, wherein mobile device 102 and APs 104 and 106 are configured to operate in accordance with the ANSI/IEEE (American National Standards Institute/Institute of Electrical and Electronics Engineers) 802.11 wireless LAN standards. Thus, APs 104 and 106 may be, for instance, 802.11 access points or base stations. Alternatively, the WLAN 100 may adhere to another ANSI/IEEE 802wireless standard, such as 802.15.1, 802.15.3, 802.15.4, 802.16, 802.20, 802.22, and the like. Further, the WLAN 100 may adhere to Global System for Mobile Communications (GSM) or other cellular standard. Thus, the mention of ANSI/IEEE 802.11 is not to be construed as a limitation.

In ANSI/IEEE 802 wireless or other embodiments, the WLAN 100 may authenticate mobile devices according to the 802.1X standard where 802.1X specifies a method for running the Extensible Authentication Protocol (EAP) directly over a link layer protocol. Thus, in such an embodiment, the WLAN 100 uses EAP methods, for example EAP-TLS based on the Transport Layer Security (TLS) protocol, to provide mutual authentication of the mobile device 102 to the AP 104 of the first network. Alternatively, other methods, such as certificate-based methods, username-password methods, hardware authentication token methods, or the like, may be used for performing this initial authentication.

Regardless of the wireless standard, the result of a successful authentication is the establishment of an AAA (authentication, authorization and accounting) state at the AP 104 which also creates a shared secret for subsequent secure communications. The AAA state may include authorized service duration, authorization expiration time, quality of service (QoS) level, Security Association (SA), etc. In one embodiment, the SA comprises a shared secret where the shared secret is keying material.

In an alternate embodiment, the mobile device 102 and the first network 104 have been preconfigured with a shared secret so that the mobile device 102 and the home device, e.g. AP 104, can communicate securely without having to perform an authentication process. Regardless of how the shared secret is placed in the mobile device 102 and the AP 104, the shared secret is necessary for subsequent secure communications between the mobile device and the home device.

Figure 2:
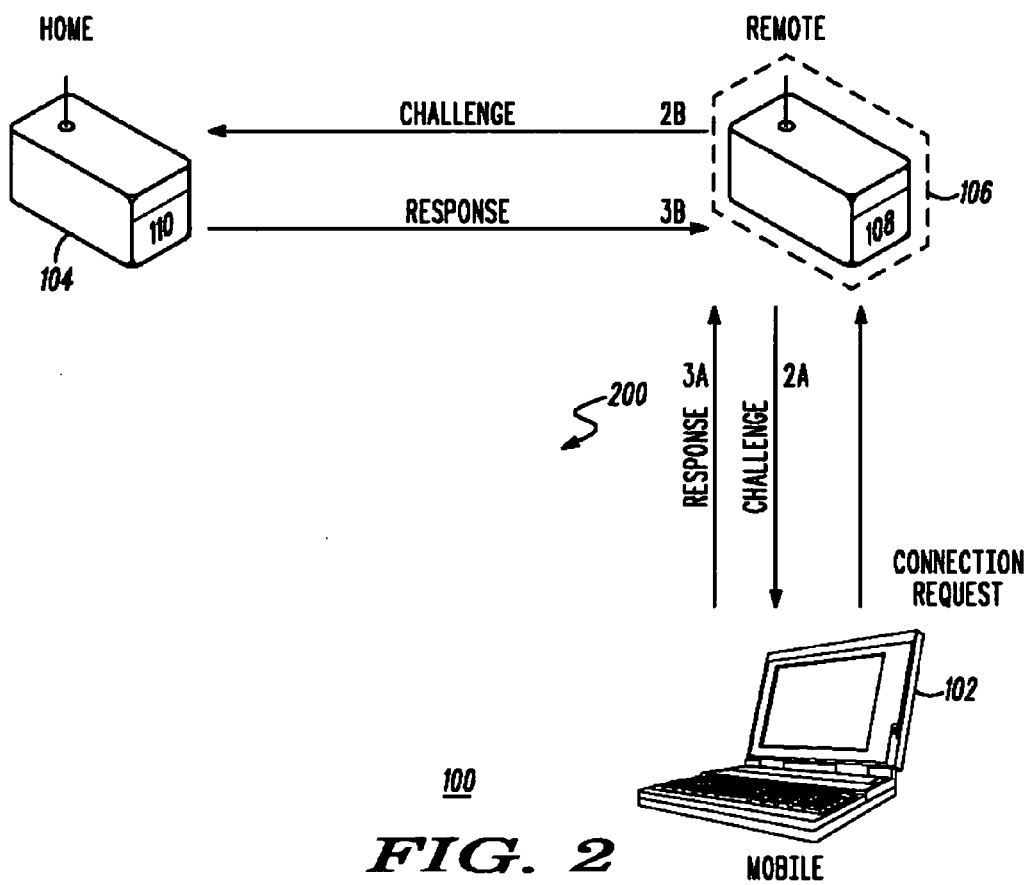
FIG. 2 is a message sequence illustrating a method for authenticating mobile devices in accordance with some embodiments of the invention.
Figure 3:
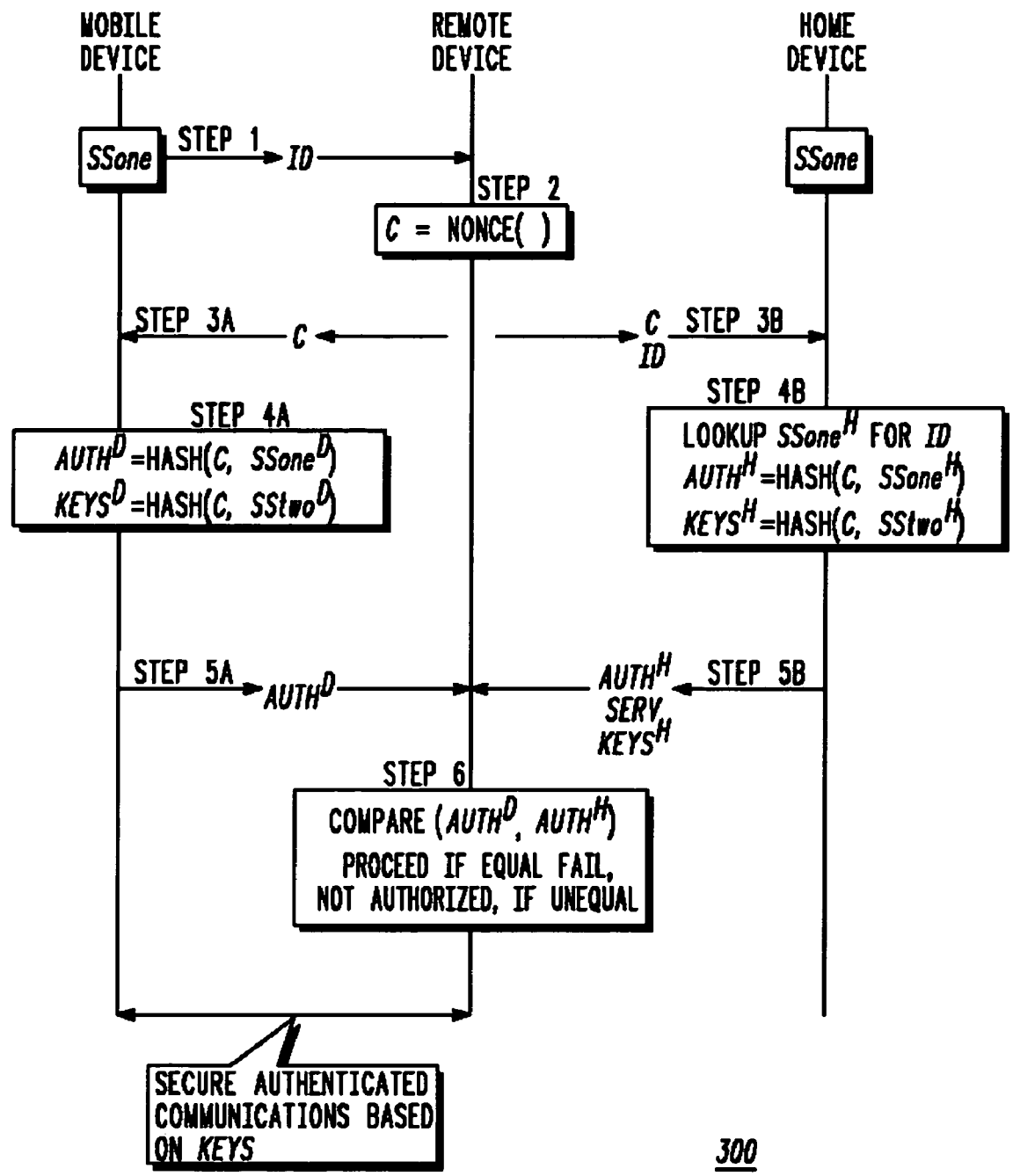
FIG. 3 is a message flow illustrating a method for authenticating mobile devices in accordance with some embodiments of the invention.

Referring to FIGS. 2 and 3, the process of authenticating a mobile device connecting to a remote network according to an embodiment of the present invention is shown. First, the mobile device 102 sends a message (shown as "Connection Request" in FIG. 2) requesting a connection to the remote device, e.g. AP 106. In the message, the mobile device 102 announces its identity ID, where the mobile device's identity is information which the remote authentication process uses to determine the home device 104 to which the mobile device 102 is authenticated, where authenticated means that the mobile device and the home device already share a secret, e.g. SSone (Step 1, FIG. 3).

In one embodiment, the identity ID is also communicated to an authentication process 108 running on the remote device, e.g. AP 106, which takes care of performing the authentication of the mobile device 102. In such an embodiment, the authentication process 108 creates a nonce challenge C (Step 2, FIG. 3) and transmits C to the mobile device 102 (Step 3A). In one embodiment, the nonce challenge C is a quantity not used before and as such may be described as non-recurring. As is known to one of ordinary skill in the art, the process of creating a nonce challenge C can be performed by a number of known methods, e.g. the use of a counter. Further, in another embodiment, the nonce challenge C may be a cryptographically strong random value in which case, C may be chosen to be large enough (e.g. greater than 160 bits) so that there is no significant chance of duplication through accident or adversarial guessing. As is known to one of ordinary skill in the art, the process of creating a nonce challenge C can be performed by a number of known methods including sampling free running oscillators or thermal noise or radioactive decay, measuring user behavior such as mouse motion and clicks, and similar entropy producing sources and hashing the data collected. As is further known to one of ordinary skill in the art, the authentication process 108 may be on the remote device, e.g. AP 106, on another remote device (e.g. not shown), or distributed among devices in the WLAN 100.

In any case, the authentication process 108 transmits C with ID to the home device (e.g. AP 104) where another authentication process (e.g. 110) may receive C and ID (Step 3B, FIG. 3). By using a challenge C that is calculated at the remote device and requiring reasonable time limits for responses, the WLAN 100 may be protected against replay attacks where someone has intercepted messages to determine authentication codes.

Continuing with FIGS. 2 and 3, the mobile device 104 and the home device 104 separately calculate an authentication code AUTH as a cryptographically strong authentication code where AUTH is a function of the shared secret SSone and the challenge C. For example, AUTH=HMAC-SHA1 (C, SSone) (Steps 4A, 4B, FIG. 3). As is known to one of ordinary skill in the art, HMAC-SHA1 is a keyed hash algorithm which can be replaced with another function having similar authentication code properties, such as HMAC-MD5 or a keyed hash function constructed using DES, AES, or the like.

The home device also uses the ID transmitted with C to determine which of several SSone quantities it may be holding for different mobile devices. Then, both the mobile device 102 seeking authentication and the home device 104 transmit the calculated AUTH back to the authentication process 106 (Steps 5A, 5B, FIG. 3). In an alternative embodiment, the AUTH from the home device 104 may be accompanied by other information such as quality of service and/or billing information SERV related to the particular mobile device seeking authentication.

Finally, the authentication process 108 compares the authentication codes AUTH received from the mobile device 102 seeking authentication and the home device 104 (Step 6, FIG. 3). If the authentication codes are different, authentication fails and access is not authorized. If they are equal, access to services available to the remote device 106 is authorized taking into account any SERV information from the home device 104.

The process of authenticating a mobile device as described above can be replicated as the mobile device moves around the WLAN 100 and as the mobile device communicates with new devices in the WLAN 100. In each new communication, subsequent authentication is based on a previous authentication such as the initial authentication to the home network, e.g. AP 104. In a highly secure WLAN, subsequent authorizations may be only dependent upon the initial authentication to the home network, e.g. AP 104, whereas other implementations may allow for subsequent authorizations dependent on any of the previous authorizations, e.g. AP 106. For example, if the mobile device 102 is requesting authorization with a new remote device where the new remote device trusts remote device 106 that the mobile device 102 has a previous trusted relationship with, then the new remote device may authenticate the mobile device 102 based upon the previous authentication. Specifically, the new remote device may authenticate the mobile device by using AUTH as a shared secret between the remote device and the mobile device. In an alternative, the home device can send SSone along with AUTH to the new remote device.

In a first alternative embodiment, where after authenticating the mobile device to the remote device, the two devices require confidential and authenticated communications, additional processing utilizing a second shared secret may be utilized. As described above, when the shared secret SSone is set up at the mobile device and the home device, a second shared secret SStwo is also configured at the same devices. Then, as authentication as outlined above is performed, both the mobile device and the home device, as well as calculating AUTH, also calculate keying material KEYS as a function of the challenge C and SS2I. For example, the keying material may be calculated as KEYS=HMAC-SHA1 (C, SS2) (Steps 4A, 4B, FIG. 3) (or with another keyed hash algorithm as mentioned above). KEYS is retained at the mobile device. Further, KEYS calculated at the home device is transmitted back from the home device to the remote device along with AUTH and possibly SERV in a response (Step 5B, FIG. 3) to the challenge (Step 3B, FIG. 3B). The keying material KEYS in then used to secure data transmission between the mobile device and the remote device if access to services is authorized. Further, as the mobile device roams in the WLAN 100, the mobile device 102 may set up a confidential and authenticated communications between a new remote device based upon a prior trusted relationship with a previous remote device, e.g. AP 106.

In one embodiment of the first alternative, the communication of information, such as AUTH, KEYS and optionally SERV, is transmitted from the home device to the remote device securely. For example, the communication between the home device and the remote device is secure if the path used is physically secure or if a security protocol such as IPSEC, TLS/SSL, or SSH is used. If the path is not secure, then this embodiment may be extended by ensuring that communications from the home device are transmitted securely as described below.

In a second embodiment of the first alternative, the second secret quantity SStwo may be avoided by allowing for a larger AUTH. For example, a portion of AUTH may be used for authentication and a portion of AUTH may be used for keying. In a third embodiment of the first alternative, the second secret quantity SStwo may be avoided by using different authentication code functions of SSone and C which then are used to produce KEYS and AUTH.

In any case, cryptographic security is not required for the challenge and response messages from the mobile device to the remote device as shown in FIGS. 2 and 3 (Steps 3A, 5A, FIG. 3). This is an important benefit to an embodiment of the present invention since such security would be hard to achieve when at the time that these messages are transmitted, the mobile device has not yet been authenticated to the remote device. Successful communication using KEYS can only be made by a station having SStwo (or SSone using the alternative methods mentioned above). Thus, a device looking to intercept or forge messages will be unable to because the device will not be able to derive KEYS. Thus, successful communication using KEYS also authenticates the mobile device to the remote device as being trusted by the home device; otherwise the home device would not have provided the remote device with KEYS.

In a second alternative, where the communications between the remote device 106 and the home device 104 are not secure, an unauthorized device could send back an arbitrary response (e.g. Step 5B, FIG. 3) to the challenge (e.g. Step 3B, FIG. 3) and then inject the same response (e.g. Step 5A, FIG. 3) between the mobile device and the remote device so that this arbitrary response appears to be from the home device. The two responses would match, authenticating the mobile device and granting it access even though it might not be actually authorized by any home device. In a first embodiment of the second alternative, where there is a trust relationship between the remote device and the home device, the two devices share a secret SN. When the home device receives a challenge C, it also calculates secret keying material KN as a function of C and SN. For example, the keying material may be calculated as KN=HMAC-SHA1 (C, SN) or by using some other keyed hash algorithm or another function having similar authentication code properties as mentioned above. The home device then uses KN to encrypt and authenticate its response to the remote device using a strong cryptographic algorithm, such as AES. In the mean time the remote device also computes KN based on its knowledge of C, which it generated, and SN, which it shares with the home device. When the remote device receives the secured response from the home device, the remote device uses its locally computed KN to decrypt and authenticate the response, thus getting trusted access to AUTH from the home device and to SERV and KEYS if either or both are included in the response. If, for example, the mobile device ID was not authorized service at that time or to that particular remote device, then KEYS would be absent.

In a second embodiment of the second alternative, where a trust relationship exists between the remote device and the home device, it may be inconvenient to arrange in advance for there to always be a shared secret SN between the two devices. If that is the case and the additional computational burden of public key operations is acceptable, alternatives technique can secure the home device communications. In particular, the home device can encrypt its response under a public key associated with the remote device using a variety of existing technologies using asymmetric cryptography such as RSA or elliptic curve cryptography. The remote device can then decrypt the response message using the corresponding private key that only the remote device knows. The home device can learn what public key to use through pre-caching, a certificate signed by a common trusted certification authority included with the challenge C from the remote device, or from a trusted directory.

An embodiment of the present invention provides superior features such as the following. First, strong security is provided because only the mobile device and the home device need know the secret on which authentication is based. There is no need to trust any remote device with this secret. Second, authentication latency is minimal because the authentication process (e.g. 106) running on the remote device overlaps the time for a single message round trip to the mobile device and to the home device. Thus, the delay of a full round trip is minimized. If delay between the remote device and the mobile device is the same as the delay between remote device and home device, delay can be reduced to $3/7^{ths}$ of that required by prior art techniques that retain control in the home network yielding a savings of 57%. Therefore, in a WLAN 100 where there is limited bandwidth and in environments where the application is sensitive to interruption or delay, such as real time voice or video traffic, an embodiment of the present invention improves the method of authenticating mobile devices.

It will be appreciated the authentication described herein may be comprised of one or more conventional processors and unique stored program instructions that control the one or more processors to implement, in conjunction with certain non-processor circuits, some, most, or all of the functions of the authentication described herein. The non-processor circuits may include, but are not limited to, a radio receiver, a radio transmitter, signal drivers, clock circuits, power source circuits, and user input devices. As such, these functions may be interpreted as steps of a method to perform authentication. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for authentication of a mobile device in a wireless communication network comprising the steps of:
   sharing a secret between the mobile device and a first device;
   requesting by the mobile device a connection to a second device;
   determining whether the mobile device can connect to the second device by the second device:
   (i) concurrently sending a challenge to the mobile device and sending the challenge and an identity of the mobile device to the first device;
   (ii) receiving a first authentication code from the mobile device based on the shared secret at the mobile device in response to the challenge;
   (iii) receiving a second authentication code from the first device based on the shared secret at the first device in response to the challenge;
   (iv) comparing the first authentication code with the second authentication code; and
   (v) authenticating the mobile device at the second device when the first authentication code matches the second authentication code.

2. The method of claim 1 wherein the mobile device is associated with identification information.

3. The method of claim 1 wherein the step of sharing is performed by at least one of a) programming the mobile device with a secret known to the first device and b) by EAP methods.

4. The method of claim 1 wherein the step of sending a challenge adheres to at least one of a) an ANSI/IEEE 802.11, 802.15.1, 802.15.3, 802.15.4, 802.16, 802.20, and 802.22 wireless standard and b) a GSM cellular standard.

5. The method of claim 1 further comprising the step of determining by a third device whether the mobile device can connect to the third device based upon a previous authentication between the second device and the first device.

6. The method of claim 1 further comprising the step of checking service information on the first device before granting access to the second device.

7. The method of claim 1 further comprising the step of setting up confidential communications between the mobile device and the second device by
   (i) calculating a first keying material at the mobile device based on a second shared secret at the mobile device;
   (ii) calculating a second keying material at the first device;

(iii) transmitting the second keying material from the first device to the second device; and (iii) providing authenticated communications between the mobile device and the second device, if the first keying material equals the second keying material.

8. The method of claim 1 wherein the first authentication code is calculated as a first function of the shared secret and the challenge.

9. The method of claim 8 wherein the first function is a keyed hash algorithm.

10. The method of claim 9 wherein the second authentication code is calculated as a second function of the shared secret, the challenge, and identification information.

11. A method for authentication of a mobile device in a wireless communication network comprising the steps of:

sharing a secret between the mobile device and a first device;

requesting by the mobile device a connection to a second device wherein the second device does not have knowledge of the shared secret;

determining by the second device whether the mobile device can connect to the second device by a) concurrently sending a challenge to the mobile device and sending the challenge and an identity of the mobile device to the first device and b) comparing responses to the challenge from the mobile device and the first device; and setting up confidential communications between the mobile device and the second device when the responses to the challenge from the mobile device and the first device match, wherein the response from the mobile device comprises: a first keying material calculated at the mobile device based on a second shared secret at the mobile device;

wherein the response from the first device comprises a second keying material calculated at the first device based on the second shared secret at the first device;

and further wherein the confidential communications between the mobile device and the second device is initiated at the second device when it determines that the first keying material equals the second keying material.

12. The method of claim 11 wherein the step of sharing is performed by at least one of a) programming the mobile device with a secret known to the home device and b) by EAP methods.

13. The method of claim 11 further comprising:

transmitting the second keying material from the first device to the second device securely based on at least one of a) a third shared secret between the second device and the first device and b) asymmetric cryptography.

14. The method of claim 11 wherein the keying material is a part of the authentication code.

15. The method of claim 11 wherein the second shared secret is an authentication code comprising a) a function of the first shared secret or b) a function of the challenge.

16. A system for authentication of a mobile device to a remote device in a wireless communication network comprising:

means for sharing a secret between the mobile device and a home device;

means for requesting by the mobile device a connection to the remote device wherein the remote device does not have knowledge of the shared secret; and means for determining by the remote device whether the mobile device can connect to the remote device by concurrently sending a challenge to the mobile device and sending the challenge and an identity of the mobile device to the home device, comparing a first authentication code based on the shared secret included in a response to the challenge from the mobile device and a second authentication code based on the shared secret included in a response to the challenge from the home device, and authenticating the mobile device at the remote device when the first authentication code matches the second authentication code.

* * * * *